United States Patent [19]

Sunouchi et al.

[11] 4,135,801
[45] Jan. 23, 1979

[54] CAMERA HAVING FILM WINDING-TO-REWINDING CONTROL BY RELEASING EITHER OF TWO BUTTONS

[75] Inventors: Akio Sunouchi, Tokyo; Susumu Kozuki, Yokohama; Yoshiaki Watanabe, Fujisawa, all of Japan

[73] Assignee: Canon Kabushiki Kaisha, Tokyo, Japan

[21] Appl. No.: 777,645

[22] Filed: Mar. 15, 1977

[30] Foreign Application Priority Data

Mar. 18, 1976 [JP] Japan .................................. 51-29534

[51] Int. Cl.² .................................................. G03B 1/00
[52] U.S. Cl. .................................................. 354/214
[58] Field of Search ........................ 354/214, 209, 173

[56] References Cited

U.S. PATENT DOCUMENTS 3,485,156 12/1965 Takahashi et al. .................... 354/214
4,012,755 3/1977 Arai ..................................... 354/214

*Primary Examiner*—John Gonzales
*Attorney, Agent, or Firm*—Toren, McGeady and Stanger

[57] ABSTRACT

In a photographic camera for use with a single-reel magazine wherein the film after withdrawn by a film advancing sprocket for exposure purposes has to be transported backwards to the magazine while the sprocket being idle, a mechanism for releasing the sprocket from braking engagement with a drive member therefor is provided with two control or rewinding buttons arranged to be manually actuable from the outside of the camera housing at respective places, one of which is located in a recess of the bottom panel thereof so that, for example, when a motor drive unit is attached thereto, an automatic responding relationship is established therebetween, and another place which is located so that, while the user is unabled to make use of the first-named rewinding button, as, for example, a tripod remains left in attachment with the camera at its bottom panel, it is made possible to switch the camera from the film winding to the rewinding state.

4 Claims, 8 Drawing Figures

CAMERA HAVING FILM WINDING-TO-REWINDING CONTROL BY RELEASING EITHER OF TWO BUTTONS

DETAILED DESCRIPTION OF THE INVENTION

This invention relates to photographic cameras, and more particularly to a mechanism for controlling film winding and rewinding operation in such cameras.

As shown in the art, 35 m/m cameras are generally designed to operate with single-reel magazines in such a way that the magazine has to collect exposed film. Before initiation of the film rewinding operation, it is necessary to cut off a clutch at, for example, between a film advancing sprocket and a drive member therefor in response to a release of a member movably mounted in the camera housing to be manually actuable from the outside thereof. While the sprocket being idle, the rewinding crank is operated to transport the film backwards from the take-up reel to the supply reel of the magazine. In the prior art, the manually operable release member is formed as extending into a recess provided in a portion of the bottom panel of the camera housing, i.e., as a control or rewinding button. This button arrangement has a disadvantage such that the camera with a tripod attached thereto at the bottom thereof can not be switched from the film winding to the rewinding position. Each time the necessity of backward transportation of the film arises, therefore, the tripod must be taken out of the camera. This constitutes a very troublesome operation and is time-consuming.

It is known to provide an alternative arrangement of the control button as located on the top or front panel of the camera housing. In the case of a so-called "system camera" rendering it possible to effect automatic control of the film winding and rewinding operation as a motor drive unit is attached to the camera at the bottom panel of the housing thereof, however, it is desirable to establish an automatic responding relationship between the camera and the motor drive unit such that when the motor drive unit is actuated to run in the reversed direction at the termination of exposure of the available full length of film, the camera is automatically switched from the winding-up position to the rewinding position. In application to such system camera, therefore, this alternative arrangement of the rewinding button is to lead to an increase in the complexity of structure of a mechanism embodying the automatic responding relationship described above.

Accordingly, it is the object of the present invention to provide a camera for use with a single-reel magazine wherein a backward transportation of the film to the magazine can be rendered conductive regardless of whether or not the camera is associated with either of the tripod and motor drive unit as mounted on the bottom panel of the camera housing.

To achieve this, there are provided two control buttons for a mechanism for releasing a film advancing sprocket from braking engagement with a drive shaft therefor as arranged at respective positions, one of which is located on the bottom panel of the camera housing, and the other of which is located on the upper panel so that it is made possible to switch the camera from the film winding to the rewinding state even when the button on the bottom panel is not accessible to the operator.

A fuller understanding of the invention can be had by referring to the following description and claims taken in conjunction with the accompanying drawings in which:

Figure 1:
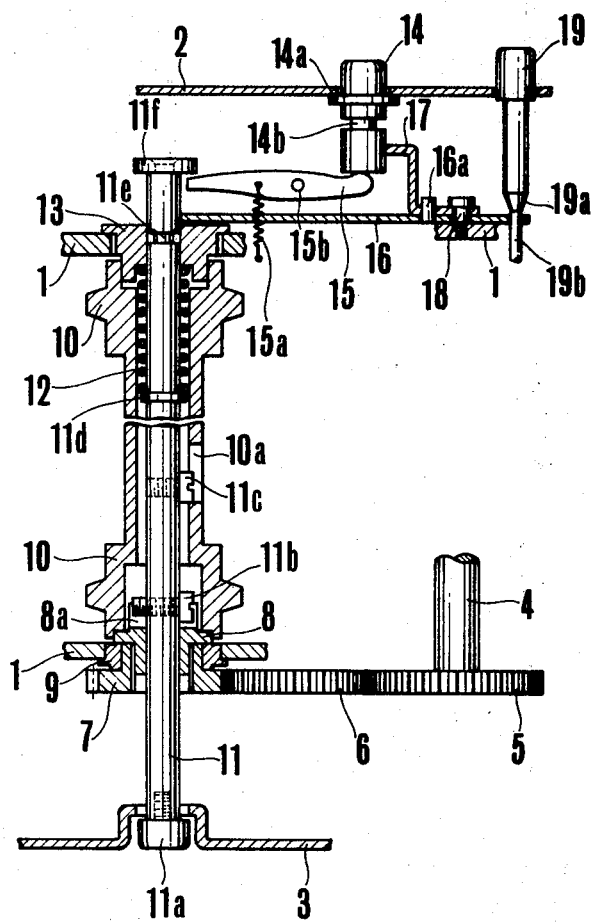
FIG. 1 is a partly elevational partly sectional view of one embodiment of an actuating mechanism operatively associated with a film transporting mechanism according to the present invention in the film winding-up position.

Referring to FIGS. 1 to 6, the film transporting mechanism comprises a shaft 4 having a master gear 5 at the bottom end thereof, the top end of which is drivingly connected to a film winding lever not shown through some suitable one-way clutch mechanism not shown, and also to a suitable take-up reel not shown, an intermediate gear 6 meshing with master gear 5, and a drive gear 7 meshing with intermediate gear 6 for driving a sprocket 10 through a clutch mechanism. The sprocket 10 is rotatably mounted at the bottom end on a flanged portion of a bushing 8 fixedly secured to the drive gear 7 and at the opposite or top end on a bearing 13. The drive gear 7 is rotatably mounted on a bearing 9. These two bearings 9 and 13 are fixedly secured to the camera housing 1. The clutch mechanism comprises a recess 8a formed in an upwardly extending portion of the flanged bushing 8, and a pin 11b which is fixedly mounted on a release plunger 11 passing through a hollow core of the sprocket 10 and which is arranged to enter the recess 8a as shown in FIG. 1 when the camera is set in the film winding state, so that the plunger 11 can receive torque from the drive gear 7.

The plunger 11 is mounted for longitudinal and rotative movement on the bearing 13 and flanged bushing 8 and is biased downwardly by a helical spring 12 around the plunger 11 between the bearing 13 and a collar 11d, so that the lower end of the plunger 11 extends into a recessed portion of the bottom panel 3 of the camera housing to form a first release or rewinding control button 11a manually actuable from the outside of the camera housing. In order to transmit torque from the plunger 11 to the sprocket 10, there is provided a pin 11c fixedly mounted on the plunger 11 near to the center of the length thereof and radially extending into a longitudinally elongaged slot 10a provided in the sprocket 10 to permit longitudinal movement of the plunger 11 while preventing rotative movement of the plunger 11 relative to the sprocket 10. The upper end of the plunger 11 forms a contact flange 11f arranged to cooperate with a two-armed lever 15 fulcrumed at a pin 15b and biased by a spring 15a in a counter-clockwise direction to urge a second release or rewinding control button 14 for outward projection from the upper panel 2 of the camera housing until a collar 14a abuts against the lower surface of the upper panel 2, as the opposite end of the lever 15 to that contacting with the contact flange 11f bears against the bottom end of a rod which carries the button 14 at the upper end thereof. The parts 11, 11a, 11f, 14, 14a, 15, 15a and 15b constitute an actuating mechanism of the invention.

Figure 2:
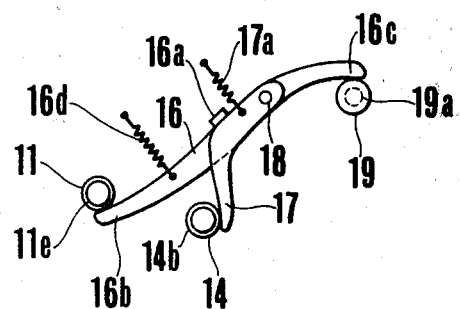
FIG. 2 is a top view of the locking lever arrangement for the actuating mechanism of FIG. 1.
Figure 4:
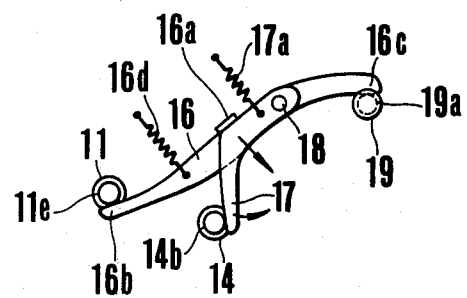
FIG. 4 is a similar view to that of FIG. 2 but in an active position.
Figure 6:
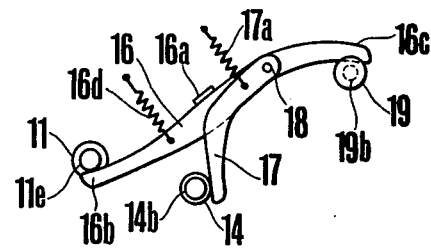
FIG. 6 is a similar view to that of FIG. 4 but in an alternative active position occurring when the system of FIG. 5 is established.

A locking mechanism for the actuating mechanism comprises first and second levers 16 and 17 fulcrumed at a common pin 18, and pivotal independently of each other, as shown in FIG. 2. The pin 18 is fixedly mounted on the camera housing 1. The first lever 16 is biased by a spring 16d for normally abutting engagement at one end 16b with the plunger 11 at a point between the contact flange 11f and the bearing 13. In order to arrest plunger 11 in the released position against the force of the spring 12, a circumferential groove 11e is provided to receive the lever end 16b as shown in FIG. 4. At such an event that the release of plunger 11 is effected by depression of the second control button 14, the clockwise movement of first lever 16 is accompanied by clockwise movement of second lever 17 under the action of a spring 16a to the positions shown in FIG. 4 as the bent-off portion of second lever 17 enters a circumferential groove 14b provided in the rod for the second control button 14, or otherwise second lever 17 remains unchanged in position as shown in FIG. 6. The other end 16c of first lever 16 forms a cam follower cooperative with a tapered surface 19a of a shutter release member 19 in such a manner that when the shutter release button 19 is depressed, first lever 16 is turned counter-clockwise about pin 18 against the force of spring 16d to such a degree that the opposite lever end 16b is retracted from groove 11e to permit downward movement of plunger 11 under the action of spring 12. In this case, the second lever 17 in FIG. 4 position is also turned counter-clockwise by a bent-over portion 16a of first lever 16 so that the second button 14 is pushed back under the action of spring 15a.

Operation:

With the camera set in the film winding-up state where any of the first and second rewinding control buttons 11a and 14 is not depressed to maintain the first and second locking levers 16 and 17 taken out of the respective grooves 11e and 14b as shown in FIGS. 1 and 2, the not shown film winding lever may be operated to allow the film transporting mechanism to advance film forwardly by one frame for each actuation of the winding lever from the single-reel magazine 100 (see FIG. 5) to the take-up reel, as the motion of the winding lever is transmitted through the gear train 5, 6, 7 and through the clutch mechanism 8, 8a, 11b to the plunger 11 coaxial with and drivingly connected to the sprocket 10. After the completion of one cycle of winding operation, the shutter button 19 may be depressed without affecting the first lever 16 as the lever end 16c is out of the path of the tapered portion 19a of the shaft 19b.

Figure 3:
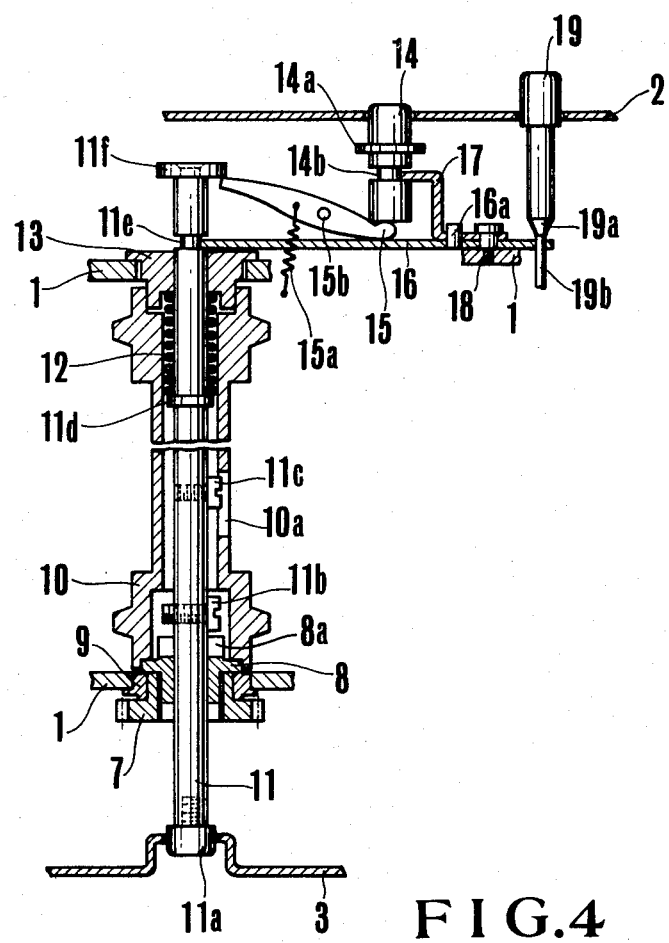
FIG. 3 is a similar view to that of FIG. 1 but in the film rewinding position.

If the photographer decides to terminate a picture taking sequence followed by the preparatory for rewinding operation, he may depress the second button 14 as a tripod remains left in attachment with the camera to unable him to make use of the first button 11a. As the second button 14 is moved downwards, the lever 15 is turned clockwise about the pin 15b against the force of spring 15a with simultaneous occurrence of upward movement of plunger 11. When the groove 11e is brought into allignment with the first lever end 16b as shown in FIG. 3, the first lever 16 is turned clockwise under the action of spring 16d to the position shown in FIG. 4, and then the second lever 17 is turned clockwise under the action of spring 17a to enter the groove 14b, so that the photographer may remove his finger from depression of the button 14 because of the maintenance of plunger 11 in the released position shown in FIG. 3, wherein the pin 11b is disengaged from the recess 8a to release the sprocket 10 from braking engagement with the drive gear 7. Then, the photographer may turn to initiation of rewinding operation by a not shown crank provided on the opposite upper panel corner to that having the winding lever. After the completion of backward transportation of the film into the magazine 100, he may depress the shutter button 19 thereby the first lever 16 is turned counterclockwise through the lever end 16c-and-tapered surface 19a coming connection along with the second lever 17 through the bent-over portion 16a-and-lever 17 connection. As the first and second levers 16 and 17 are moved away from the respective grooves 11e and 14b, the plunger 11 and the rod 14 are returned to respective initial positions shown in FIG. 1.

Figure 5:
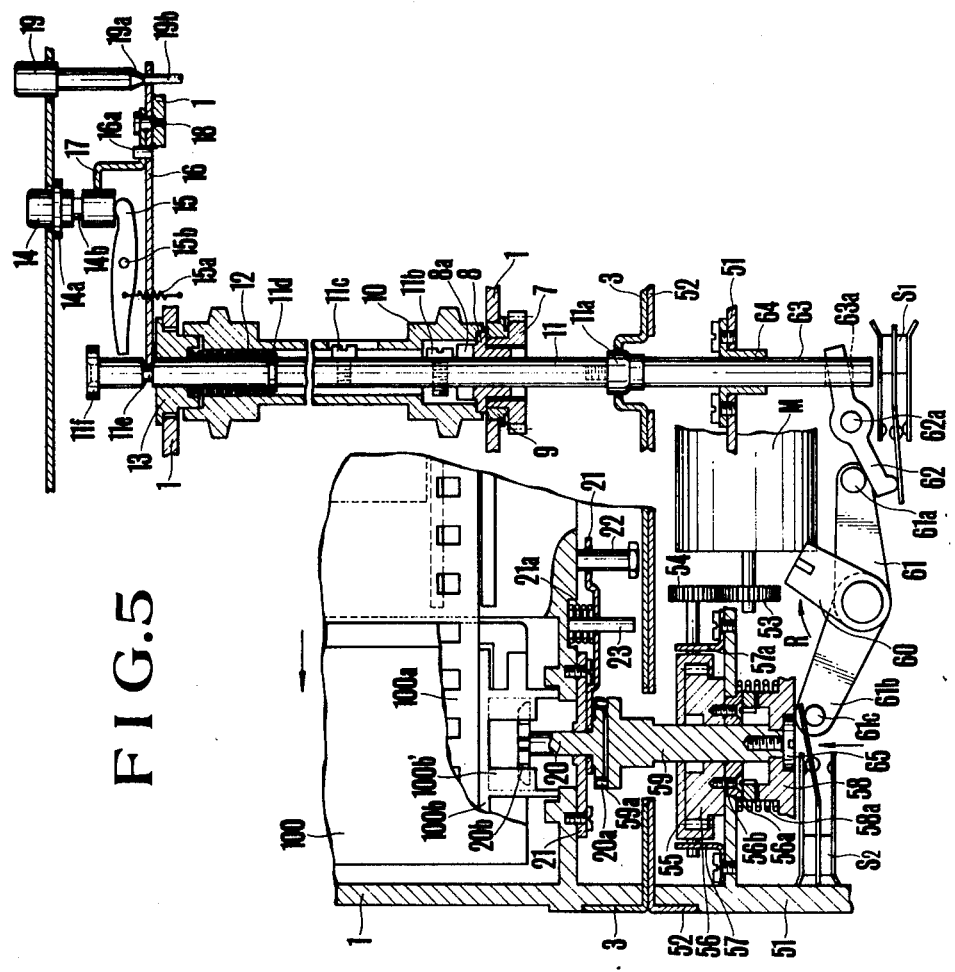
FIG. 5 is a similar view to that of FIG. 3 but as associated with a motor drive unit in the rewinding state.

FIG. 5 shows a system where the first rewinding control button 11a is coupled with an automatic actuator of a motor drive unit 51. The unit 51 is assumed to be set in the rewinding position, wherein the automatic actuator is shown as constructed in the form of a slidable bar 63 extending from the upper panel 52 of the unit housing into engagement with the first control button 11a of the camera, and having a cutout 63a formed in a lower end portion thereof to cooperate with a two-armed lever 62 at one end thereof, the opposite end of which extends into the path of movement of a pin 61a perpendicularly extending from the free end of a lever 61 connected to the shaft of a control knob 60 accessible from the outside of the unit housing, so that when the knob 60 is turned in a clockwise direction indicated by an arrow R, the lever 62 is turned in a counter-clockwise direction, causing upward movement of the actuator or bar 63 which results in the release of the sprocket 10 from the braking engagement with the drive gear 7 therefor. As the knob 60 is turned clockwise, first and second switches $S_1$ and $S_2$ controlling the direction of rotation of an electric motor M are operated.

The motor drive unit further includes a pinion 53 connected to the output shaft of motor M, a gear 54 meshing with pinion 53 and connected to a common shaft of a worm 55 rotatably mounted between L-shaped mounts 57a and 57b, a worm wheel 56 meshing with the worm 55 and fixedly mounted to a first clutch member 56a by fasteners 56b, a second clutch member 58 coaxial with and fixedly connected to a rewinding drive shaft 59 by a fastener 65 at the lower end thereof, the opposite end of which carries an adaptor 59 for coupling with an adaptor 20a of an intermediate drive shaft 20 of the camera. When the knob 60 is turned counter-clockwise from the position shown in FIG. 5, the drive shaft 59 is moved downwards with reference to the worm wheel 56 under the action of a spring 58a, thereby the first and second clutch members 56a and 58 are spaced apart from each other, while the intermediate drive shaft 20 is moved downwards under the action of a spring 21a through a plate 21, the latter being guided by pins 22 and 23, until a coupler 20b formed on the upper end of the intermediate shaft 20 is disengaged from a reel 100b of the magazine 100 at a notched portion 100b' thereof.

The operation of the system of FIG. 5 is as follows. After the picture taking of the last frame of the film 100a has been completed, the photographer may turn the knob 60 in the direction indicated by arrow R to the illustrated position, the lever 62 is turned counter-clockwise through the pin 61a-and-lever 62 connection, causing switch $S_1$ to be set from the winding to the rewinding position, and also causing the slidable bar or actuator 63 to move upwards along with the second rewinding control button 11b, so that the clutch pin 11b is disengaged from the clutch recess 8a to release the sprocket 10 from the braking engagement with the drive gear 7. At this time, the first locking lever 16 enters the groove 11e of the plunger 11 under the action of spring 16d to arrest the plunger 11 in the released position. In this case, the second locking lever 17 is not actuated.

As the knob 60 is turned in the direction indicated by arrow R, the second clutch member 58 and, with it, the drive shaft 59 are moved upwards by the end 61b of the lever 61 against the action of spring 58a, thereby the first and second clutch members 58 and 56a are brought into active engagement with each other, then the adaptors 59a and 20a are engaged with each other, and then the couplers 20b and 100b' are engaged with each other, with the resulting positions of these parts being shown in FIG. 5.

When a not shown switch is closed to drive motor M in the reversed direction, the motion of motor M is transmitted through a gear train 53, 54, 55 and 56 to the drive shaft 59 through the clutch mechanism 58, 56a. As the drive shaft 59 is rotated, the reel 100b of the magazine 100 is rotated to transport the film 100a backwards, while the sprocket 10 being idle. After the backward transportation of the film is completed, the photographer may depress the shutter button 19, thereby the first locking lever 16 is turned counter-clockwise against the force of spring 16d to result in the engagement of the clutch pin 11a with the clutch recess 8a of the flanged bushing 8.

Figure 7:
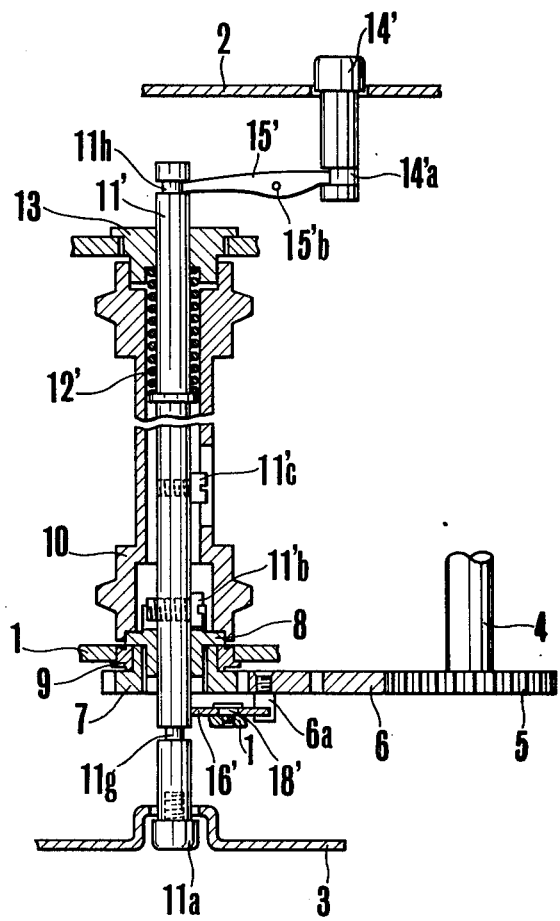
FIG. 7 is a partly elevational partly sectional view of another embodiment of the actuating mechanism according to the present invention.
Figure 8:
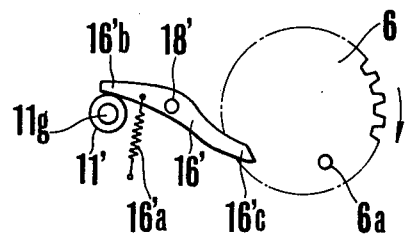
FIG. 8 is a fragmentary lower-locking elevational view of a locking lever arrangement of FIG. 7.

Referring to FIGS. 7 and 8, there is shown another embodiment of the present invention wherein the first and second rewinding control buttons always get operated in unison, and wherein a single locking lever is employed as operatively associated with the film transporting mechanism. The same numerals primed are employed in those figures to denote parts of that embodiment which remain substantially unchanged from the embodiment shown in FIGS. 1 to 6. The plunger 11' is provided with two circumferential grooves 11g and 11h, the latter always receiving one end of the lever 15', the opposite end of which is always received in the groove 14a' of the rod for the second button 14'. The other groove 11g is arranged to cooperate with a locking lever 16' in such a manner that when the plunger 11' is moved upwards, one end 16b' of the lever 16' is reached by the groove 11g to enter therein as the lever 16' is turned counter-clockwise under the action of the spring 16a'. At this time, the opposite end 16c' of the lever 16 enters into the path of movement of a pin 6a eccentrically extending from the intermediate gear 6, so that once the winding lever is cocked, the pin 6a strikes the lever end 16c' to retract the opposite lever end 16b' from the groove 11g, thereby the plunger 11 is returned to the initial position shown in FIG. 7 under the action of spring 12'.

The present invention has been described in detail with particular reference to embodiments thereof, but it will be understood that variations and modifications can be effected within the spirit and scope of the invention as described hereinabove. For example, the second rewinding button may be located on the front panel of the camera housing with a necessary modification of the linkage between it and the plunger.

What is claimed is:

1. In a camera provided with a film winding-up device including a film transporting sprocket and with a film rewinding device, a changeover device for controlling film winding-up and rewinding operation comprises;
    (a) clutch means arranged between said sprocket and a film winding-up drive mechanism,
    (b) first actuating means positioned on the bottom panel of the camera housing to connect and disconnect said clutch means; and
    (c) second actuating means positioned on the upper panel of the camera housing for operating said clutch means,
whereby said clutch means is disconnected by any one of said actuating means so that the sprocket is rendered freely rotative for film rewinding purposes.

2. A camera according to claim 1, wherein said camera is attachable to a motor drive unit for film winding-up and rewinding purposes, and one of said actuating means is connectable to changeover means of said motor drive unit.

3. In a camera provided with a film winding-up device including a film transporting sprocket and with a film rewinding device, a changeover device for controlling film winding-up and rewinding operation comprises;
    (a) clutch means arranged between said sprocket and a film winding-up drive mechanism,
    (b) two actuating means for operating the clutch means, one of said actuating means being arranged on the bottom panel of the camera, and the other being arranged on another panel of the camera,
    whereby said clutch means is disconnected by any one of said actuating means so that the sprocket is rendered freely rotative for film rewinding purposes.

4. A camera according to claim 3, wherein said camera is attachable to a motor drive unit for film winding-up and rewinding purposes, and one of said actuating means is connectable to changeover means of said motor drive unit.

* * * * *